(12) United States Patent
Patil et al.

(10) Patent No.: US 6,777,514 B2
(45) Date of Patent: Aug. 17, 2004

(54) GEMINALLY DISUBSTITUTED OLEFIN-CARBON MONOXIDE-ETHYLENE POLYMER USEFUL AS A POLYVINYL CHLORIDE PLASTICIZER AND A METHOD OF MAKING SAME

(75) Inventors: Abhimanyu O. Patil, Westfield, NJ (US); Nicholas V. Smith, Houston, TX (US); Jose G. Santiesteban, Baton Rouge, LA (US); Allen D. Godwin, Seabrook, TX (US); Steven P. Rucker, Warren, NJ (US); Stephen Zushma, Clinton, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 10/228,755

(22) Filed: Aug. 27, 2002

(65) Prior Publication Data

US 2004/0044159 A1 Mar. 4, 2004

(51) Int. Cl.$^7$ .................................................. C08F 4/28
(52) U.S. Cl. ...................... 526/227; 526/312; 526/316; 526/319; 526/348.6
(58) Field of Search .............................. 526/227, 312, 526/316, 348.6, 319

(56) References Cited

U.S. PATENT DOCUMENTS

| | | | |
|---|---|---|---|
| 2,495,286 A | 1/1950 | Brubaker | 260/63 |
| 3,780,140 A | 12/1973 | Hammer | 260/884 |
| 4,804,738 A * | 2/1989 | Drent | 528/392 |
| 5,763,556 A | 6/1998 | Shaffer et al. | 526/348.4 |
| 5,814,715 A * | 9/1998 | Chen et al. | 526/237 |
| 6,262,225 B1 | 7/2001 | Patil et al. | 528/392 |

FOREIGN PATENT DOCUMENTS

| | | | |
|---|---|---|---|
| EP | 0 264 159 | * 10/1987 | |
| EP | 0264159 A1 | 10/1987 | C08G/67/02 |
| WO | WO 90/13600 | 11/1990 | C08L/23/08 |
| WO | WO 97/44370 | 11/1997 | C08F/210/02 |
| WO | WO 00/43430 | 7/2000 | C08F/240/00 |
| WO | WO 02/06379 A1 | 1/2002 | C08G/67/02 |
| WO | WO 02/06395 A2 | 1/2002 | C08L/27/00 |
| WO | WO 02/06416 A2 | 1/2002 | C09J/173/00 |

* cited by examiner

*Primary Examiner*—Ling-Siu Choi
(74) *Attorney, Agent, or Firm*—Joseph C. Wang

(57) ABSTRACT

The invention is related to a geminally disubstituted olefin-carbon monoxide-ethylene polymer. The invention is also related to a method for preparing geminally disubstituted olefin-carbon monoxide-ethylene polymers by reacting a geminally disubstituted olefin feed, a carbon monoxide feed and an ethylene feed under free radical polymerization conditions. The invention is further related to a geminally disubstituted olefin-carbon monoxide-ethylene-X polymer, where monomer X is a free radical polymerizable monomer. The invention is also directed to a method for preparing geminally disubstituted olefin-carbon monoxide-ethylene-X polymers by reacting a geminally disubstituted olefin feed, a carbon monoxide feed, an ethylene feed and a feed containing monomer X under free radical polymerization conditions. The polymers of the invention are useful as polyvinyl chloride plasticizers.

7 Claims, 1 Drawing Sheet

GEMINALLY DISUBSTITUTED OLEFIN-CARBON MONOXIDE-ETHYLENE POLYMER USEFUL AS A POLYVINYL CHLORIDE PLASTICIZER AND A METHOD OF MAKING SAME

FIELD OF THE INVENTION

The invention is directed towards polymers of geminally disubstituted olefins, carbon monoxide and ethylene. The invention also encompasses a method for producing the geminally disubstituted olefin-carbon monoxide-ethylene polymers using free radical polymerization.

BACKGROUND OF THE INVENTION

Terpolymers of ethylene-carbon monoxide-X ("E—CO—X"), where X is third monomer, such as vinyl acetate or methyl methacrylate, are generally made from ethylene, carbon monoxide ("CO"), and vinyl acetate or methyl methacrylate feeds. These polymers are prepared using free radical initiators at high pressures and temperatures. Furthermore, these polymers are random, which are generally difficult to make using organometallic catalysts. The E—CO—X polymers formed from free radical polymerization are useful as polyvinyl chloride ("PVC") modifiers and degradable films.

Geminally disubstituted olefin monomers, such as isobutylene, are known not to be readily polymerizable by free radical polymerization mechanisms. Instead, such disubstituted a-olefins are typically polymerized and copolymerized by cationic or carbocationic polymerization with Lewis acid catalyst systems known to initiate the formation of carbocations.

PVC is one of the most economic, versatile and useful commodity polymers for a wide variety of applications. Presently, PVC is the second largest thermoplastic resin manufactured behind polyolefins, with a world-wide capacity of approximately 31 millions tons. The exceptional versatility of PVC is partially due to its ability to form stable solutions of wide percentage composition with a variety of plasticizers and additives.

Plasticizers are added to plastics to improve flow and, therefore, processability and flexibility, and to reduce the brittleness of the product. This is achieved by lowering the glass transition temperature (Tg) below room temperature, thus achieving a change in properties from that of a hard, brittle, glasslike solid to that of a soft, flexible, tough material. There are presently about 450 different plasticizers produced worldwide, although only about 50 of these are classified as commercially important. Approximately 90% of these products are used in the production of plasticized or flexible PVC.

More than 95% of these plasticizers are very low molecular weight (<500) monomeric esters. One of the problems with low molecular weight plasticizers is their tendency to volatilize during the various processing steps in manufacturing flexible PVC articles. Volatilization losses in end uses can be even greater. Also, plasticizers leave by volatilization, migration, and extraction. Plasticizers can migrate into other materials, such as other PVC, polystyrene, acrylics and ABS, or even some nitrocellulose based paint finishes. It is desirable to have products with lower volatility, less migration and more extraction resistance. Using high molecular weight polymers minimizes the volatility problems.

BRIEF SUMMARY OF THE INVENTION

In one embodiment, the instant invention provides geminally disubstituted olefin-carbon monoxide-ethylene polymers. These polymers may be used as effective plasticizers in polyvinyl chloride compositions.

In another embodiment, the invention is a composition comprising a geminally disubstituted olefin-carbon monoxide-ethylene-X polymer, wherein monomer X is a free radical polymerizable monomer or mixtures of monomers. Monomer X is selected from $C_3$ to $C_{30}$ alpha-olefins, $C_3$ to $C_{30}$ internal olefins, styrene, styrene derivatives, unsaturated mono- and dicarboxylic acids of 3–20 carbon atoms, esters of such unsaturated mono- and dicarboxylic acids, vinyl esters of saturated carboxylic acids wherein the acid group has 1–18 carbon atoms, vinyl alkyl ethers wherein the alkyl group has 1–18 carbon atoms, halogenated ethylene derivatives, methyl vinyl ketone, 1-vinylpyrrolidone, acrylonitrile, acrylamide, acrolein, allyl alcohol, allyl chloride, allyl acetate, and mixtures thereof. The mixtures of monomer X can also be raffinate I or raffinate II.

In yet another embodiment, the invention is a polymerization method comprising reacting a geminally disubstituted olefin feed, a carbon monoxide feed and an ethylene feed under free radical polymerization conditions to form a geminally disubstituted olefin-carbon monoxide-ethylene polymer.

In still another embodiment, the invention is a polymerization method comprising reacting a geminally disubstituted olefin feed, a carbon monoxide feed, an ethylene feed and a feed containing monomer X under free radical polymerization conditions to form a geminally disubstituted olefin-carbon monoxide-ethylene-X polymer, wherein monomer X is a free radical polymerizable monomer.

Another embodiment of the present invention is a PVC resin composition comprising polyvinyl chloride and a plasticizer selected from either: i) a geminally disubstituted olefin-carbon monoxide-ethylene polymer; ii) a geminally disubstituted olefin-carbon monoxide-ethylene-X polymer; or iii) mixtures thereof, wherein said monomer X comprises a free radical polymerizable monomer, and further wherein said polymers are synthesized at free radical polymerization conditions.

The instant invention is further directed to a method for preparing such a PVC resin by blending PVC with either: i) a geminally disubstituted olefin-carbon monoxide-ethylene polymer; ii) a geminally disubstituted olefin-carbon monoxide-ethylene-X polymer; or iii) mixtures thereof.

These and other features, aspects and advantages of the present invention will become better understood with regard to the following description and appended claims.

DETAILED DESCRIPTION OF THE INVENTION

Figure 1:
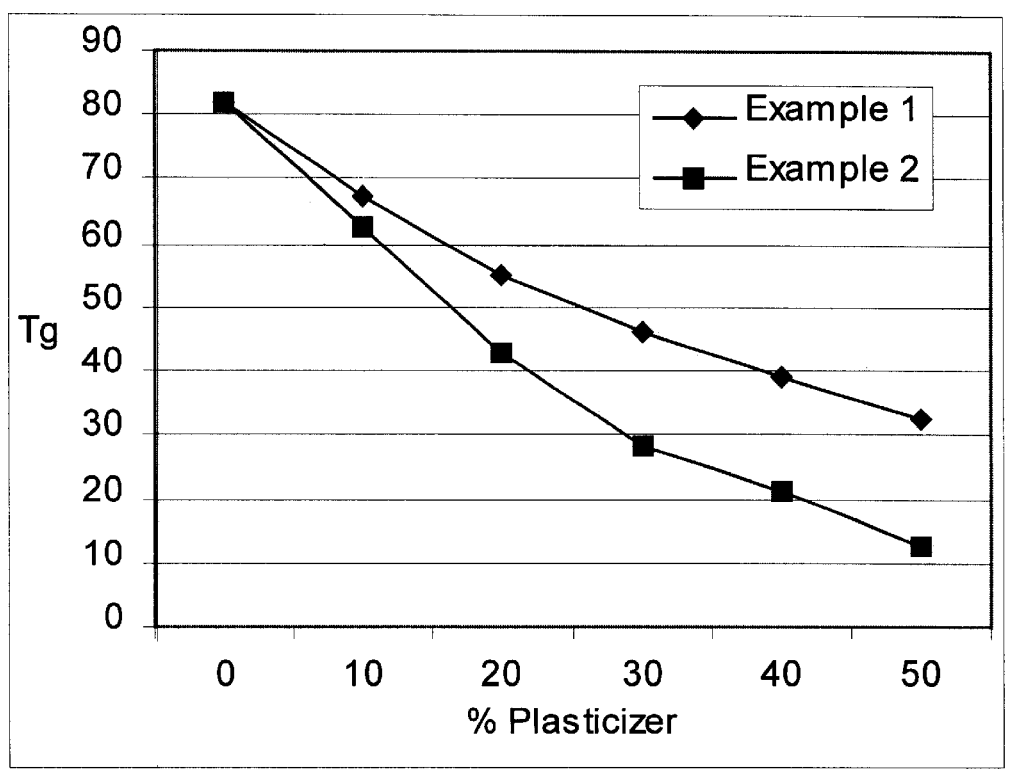
FIG. 1 shows the decrease in the Tg of PVC upon addition of various levels of the isobutylene/CO/ethylene polymers.

In one embodiment, the invention is a composition comprising a geminally disubstituted olefin-carbon monoxide-ethylene polymer. It should be appreciated by those skilled in the art that the term "polymer" is used herein according to its broad meaning of a macromolecule formed from at least one monomer source.

The term "geminally disubstituted olefins" useful in accordance with the invention include essentially any olefin having the generic formula:

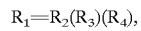

where $R_1$ is $CH_2$, $R_2$ is C, and $R_3$ and $R_4$ are, independently, essentially hydrocarbyl groups containing at least one carbon atom bound to $R_2$. Preferably, $R_3$ and $R_4$ are linear, branched or cyclic, substituted or unsubstituted, hydrocarbyl groups having from 1 to 100 carbon atoms, preferable 30 or less carbon atoms, and optionally $R_3$ and $R_4$ are connected to form a cyclic structure. Thus, the term geminally disubstituted olefins includes both monomers, such as isobutylene, and macromers having the representative structure above. Though $R_3$ and $R_4$ are to be essentially hydrocarbyl, the inclusion of non-hydrocarbyl atoms (such as O, S, N, P, Si, halogen, etc.) is contemplated where such are sufficiently far removed from the double bond so as not to interfere with the polymerization reactions. The geminally disubstituted olefins specifically include isobutylene, 3-trimethylsilyl-2-methyl-1-propene, 2-methyl-1-butene, 2-methyl-1-pentene, 2-ethyl-1-pentene, 2-methyl-I-hexene, 2-methyl-1-heptene, 6-dimethylamino-2-methyl-1-hexene, a-methylstyrene and the like as representative compounds.

In another embodiment, the invention is a composition comprising a geminally disubstituted olefin-carbon monoxide-ethylene-X polymer, wherein monomer X is a free radical polymerizable monomer or mixture of monomers. Monomer X is selected from the group consisting of $C_3$ to $C_{30}$ alpha-olefins; $C_3$ to $C_{30}$ internal olefins; styrene and styrene derivatives; unsaturated mono- and dicarboxylic acids of 3–20 carbon atoms, such as acrylic acid and methacrylic acid; esters of such unsaturated mono- and dicarboxylic acids, such as n-butyl acrylate, methylacrylate and methyl methacrylate; vinyl esters of saturated carboxylic acids wherein the acid group has 1–18 carbon atoms, such as vinyl acetate; vinyl alkyl ethers wherein the alkyl group has 1–18 carbon atoms, such as isobutyl vinyl ether; halogenated ethylene derivatives; methyl vinyl ketone; 1-vinylpyrrolidone; acrylonitrile; acrylamide; acrolein; allyl alcohol; allyl chloride; allyl acetate; and mixtures thereof. The preferred internal olefins are 2-butene, 2-pentene and 3-hexene, the most preferred of which is 2-butene. By styrene derivative, it is intended to include styrenes having substitution on either the olefinic or phenylic function of the styrene molecule. Of the halogenated ethylene derivatives, the most preferred are tetrafluoroethylene and vinyl chloride. When monomer X is a mixture of monomers, raffinate I and raffinate II are the preferred types and are described in more detail hereinbelow.

The number average molecular weight ("Mn") of the copolymers formed in accordance with the invention can range from about 100 to about 1,000,000 with a preferred range from about 200 to 150,000. In a preferred embodiment, the polymer of the invention comprises 1–40 mole % of the geminally disubstituted olefin, 3–40 mole % of carbon monoxide, and 5–80 mole % of ethylene.

In a further embodiment, the invention provides a polymerization method for reacting a geminally disubstituted olefin feed, a carbon monoxide feed and an ethylene feed under free radical polymerization conditions to form a geminally disubstituted olefin-carbon monoxide-ethylene polymer described above. While there is no preference as to the source of the geminally disubstituted feed, carbon monoxide feed and ethylene feed, the present invention anticipates that either pure or dirty and/or dilute feeds may be utilized in the polymerization process.

In another embodiment, the invention is directed to a polymerization method for reacting a geminally disubstituted olefin feed, a carbon monoxide feed, an ethylene feed and a feed containing monomer X under free radical polymerization conditions to form a geminally disubstituted olefin-carbon monoxide-ethylene-X polymer, wherein said monomer X comprises a free radical polymerizable monomer or mixtures of monomers, as described above. Among the various feeds that may be used for mixtures of monomer X, the two that are especially applicable to the instant invention are raffinate I (Raff-I) and raffinate II (Raff-II). Typical Raff-I and Raff-II composition percentages are as follows, although one skilled in the art knows that such amounts can vary depending on the source of the feed:

| Feed composition | Raff-I wt. % | Raff-II wt. % |
|---|---|---|
| 1-Butene | 34 | 45 |
| 2-butenes | 20 | 25 |
| Isobutylene | 25 | 4 |
| Butanes | 17 | 21 |
| Butadiene | 0.5 | 0.3 |
| Other | 3.5 | 4.7 |

Other mixtures that can be used as a feed for monomer X can come from light olefins from fluidized catalytic cracking ("FCC"), propylene/C4 olefins, such as n-butenes and isobutylene, and C4 olefin streams from methanol-to-olefin ("MTO") processes.

The polymers prepared in accordance with this invention may be recovered using conventional methods. For example, filtration or evaporation of the diluent may be used. Further, the polymers may be brought into the desired shape using standard forming techniques, such as cold or hot pressing. Alternatively, the polymerization is carried out in such a way that the polymer is formed in the desired shape, such as by solution polymerization in a thin layer and subsequent removal of the diluent, which yields the polymer in the form of a film.

The free radical polymerization process disclosed herein uses free radical initiators according to conventional methods well known to those skilled in the art. Representative initiators include, but are not limited to, organic peroxides, such as alkyl peroxides, dialkyl peroxides, aroyl peroxides and peroxy esters, and azo compounds. Preferred alkyl hydroperoxides include tertiary-butyl hydroperoxide, tertiary-octyl hydroperoxide and cumene hydroperoxide; preferred dialkyl peroxides include ditertiary-butyl peroxide, 2,5-dimethyl-2,5-di(t-butylperoxy)hexane and di-cumyl peroxide; preferred aroyl peroxides include benzoyl peroxide; preferred peroxy esters include tertiary-butyl peroxypivalate, t-butylperoxy-2-ethylhexanoate (Trigonox 21™) and tertiary-butyl-perbenzoate; and preferred azo compounds include azo-bis-isobutyronitrile. Free radical initiators with an appropriate half-life at reaction temperatures ranging from about 50° C. to about 300° C. can be used. Of these, t-butyl peroxypivalate, t-butylperoxy-2-ethylhexanoate (Trigonox 21™) and t-butyl peroxide are most preferred.

Typically copolymerization will occur at temperatures ranging from about 50 to about 300° C. and preferably from about 50° C. to about 200° C. Pressures can range from about 100 to about 30,000 psig and preferably from about 500 psig to about 20,000 psig.

Preferably, the reaction occurs in the presence of a solvent. Suitable solvents include toluene, acetone, alkanes, aromatics and derivatives thereof, dioxane, propylene oxide, cyclohexane, supercritical carbon dioxide, and mixtures thereof. Hexane is the most preferred solvent of the alkanes, but other preferred alkanes are pentane and heptane and a mixture of these alkane solvents. Of the aromatic solvents, benzene is the most preferred.

In still another embodiment, the instant invention is for a polyvinyl chloride ("PVC") resin composition comprising polyvinyl chloride and a plasticizer that contains either: i) a geminally disubstituted olefin-carbon monoxide-ethylene polymer, as disclosed above; ii) a geminally disubstituted olefin-carbon monoxide-ethylene-X polymer, as disclosed above; or iii) mixtures thereof, wherein said monomer X comprises a free radical polymerizable monomer, as disclosed above.

In addition to the plasticizers defined above, the PVC composition may optionally contain mixtures with phthalate esters, such as diisodecyl phthlalate, diisononyl phthalate, di-2-ethyl hexyl phthalate or diisotridecyl phthalate; with adipates, such as di-2-ethylhexyl adipate or di-isononyl adipate; with trimellitate esters, such as tri-2-ethylhexyl trimellitate or tri-isononyl trimellitate; or even with benzoate esters, such as di- or tri-propylene glycol dibenzoate.

In a preferred embodiment, the ratio of geminally disubstituted olefin-carbon monoxide-ethylene polymer or geminally disubstituted olefin-carbon monoxide-ethylene-X polymer plasticizer to dialkyl phthalates will be in the range of 9:1 to 1:9 on a weight basis, and the mix of these plasticizers will account for about 0.01 to 90 weight percent of the PVC resin composition. Thus, in this preferred embodiment, the polyvinyl chloride will make up approximately 25 to 99.99 weight percent of the PVC resin composition.

The PVC composition may also further comprise stabilizers, fillers, and/or other well-known additives that are commonly used in the art. Suitable stabilizers include, but are not limited to, inorganic salts of calcium, barium, cadmium, zinc, lead and mixtures thereof. In formulating PVC, additives are added according to a term "phr" which means parts per hundred resins. Preferably, the stabilizers will make up approximately 0 to 10 phr. Suitable fillers include, but are not limited to, calcium carbonate, clay and mixtures thereof. Preferably, fillers will be approximately 0 to 80 phr.

A typical formulation for a flexible PVC product may be as follows:

| | |
|---|---|
| PVC resin | 100 parts |
| Plasticizer | 20–100 parts |
| Stabilizer | 2–6 parts |
| Fillers such as calcium carbonate | 0–80 parts |
| Lubricants such as stearic acid | 0–0.5 parts |
| Other additives | 0–10 parts |

Depending on the particular plasticizer(s) used and the type of PVC, percentage mix, etc., advantages of the instant invention include: lower plasticizer volatility and accompanying lower migration; improved processability and compatibility; and effective lowering of the PVC resin glass transition temperature.

In another embodiment, the invention is an article produced from the PVC resin composition described above. For instance, the PVC resin composition could be made into a film or a sheet. Articles can also be extruded, molded or cast from the PVC resin composition, as is known to one skilled in the art.

Also provided for is a method for a preparing a PVC resin comprising blending polyvinyl chloride with a plasticizer, as defined above. The method may further include the step of blending a dialkyl phthalate or other suitable monomeric esters. Additionally, stabilizers and/or fillers may also be blended. Standard PVC/plasticizer blending techniques are well-known to those skilled in the art. Typical temperatures for such blending techniques are in the range of about 20° C. to 300° C. Preferred temperature ranges are from about 50° C. to 230° C. Typical pressures for these blending techniques can range widely from about 100 psi to 60,000 psi. Preferred pressure ranges are in the range of about 100 psi to 30,000 psi. Processing aids, such as stearic acid, may optionally be used. Thus, small amounts of these processing aids may, or may not, become incorporated into the composition. Additionally, as illustrated in the examples below, the polymer can be dissolved in organic solvents along with the PVC and then cast to form a film.

The invention is further described in the following non-limiting examples.

EXAMPLES

Example 1

Synthesis of Isobutylene-CO-Ethylene Polymer

A 300-mL Autoclave Engineers™ reactor was charged with 125-mL of pure n-hexane and 9.96 g of isobutylene. 0.48 g of t-butyl peroxypivalate in 25-mL of pure n-hexane was loaded in an addition funnel and attached to the autoclave unit. The reactor was sealed and purged with purified nitrogen. The reactor was then pressurized with an ethylene and carbon monoxide (80:20) mixture. The temperature was raised to 66° C. while stirring, and peroxide solution was added to the reactor. The reactor pressure was maintained at 700 psig with the ethylene and carbon monoxide (80:20) mixture for 24 hours. The reactor was allowed to cool to room temperature and depressurized. Hexane was removed using a rotary evaporator, leaving 7.28 g of the colorless viscous product.

The IR spectrum of the product showed a very strong peak at 1712 $cm^{-1}$ due to the carbonyl group. This shows that CO has been incorporated into the product. The $^{13}C$ NMR analysis of the product suggests that 32 mole % of CO has been incorporated into the product. The product composition based on $^{13}C$ NMR was ethylene at 60 mole %, CO at 32 mole % and isobutylene at 8 mole %. The NMR also suggested that there are 46.8 branches/1000 carbon atoms. In Example 1 and all other Examples herein, the branch content determined by the NMR sum contributions are from propyl and longer, ethyl, ethyl ketone, and isolated methyls. This does not include the branches from the geminal dimethyls from isobutylene. The GPC of the product indicated an Mn of 3280 and Mw of 5520 (polystyrene standards, THF solvent).

Example 2

Synthesis of Isobutylene-CO-Ethylene Polymer

A 1-L autoclave reactor was charged with 400-mL of pure n-hexane and the reactor was sealed and purged with purified nitrogen. The reactor was then pressurized with an ethylene and carbon monoxide (80:20) mixture to 2000 psig. The temperature was raised to 170° C. while stirring. 33.56 g of isobutylene was then added to the reactor. 0.524 g of t-butylperoxy-2-ethylhexanoate (Trigonox 21™) peroxide in 50-mL of pure hexane was added and the pressure was increased to 3000 psig. The pressure was maintained at 3000 psig and the temperature was maintained at 170° C. for 24 hours. The reactor was allowed to cool to room temperature and depressurized. Hexane was removed using a rotary evaporator, leaving 11.32 g of the liquid product. The IR spectrum of the product showed a very strong peak at 1712 cm$^{-1}$ due to the carbonyl group. Thus, CO has been incorporated in the product. The $^{13}$C NMR analysis of the product suggests that 14 mole % of CO has been incorporated in the product. The product composition based on $^{13}$C NMR was ethylene at 77 mole %, CO at 14 mole % and isobutylene at 9 mole %. The NMR also suggested that there are 104.8 branches/1000 carbon atoms. The GPC of the product indicated an Mn of 1360 and Mw of 3400 (polystyrene standards, THF solvent).

Example 3

Plasticization Study Using Isobutylene-CO-Ethylene Polymer

To demonstrate in a simple manner the effect of plasticization, films of the polymers were prepared as follows: 10 g of PVC polymer (Aldrich, 233,000) were dissolved in 150 ml of THF and the solution was stirred at room temperature for 24 hours to obtain a stock solution. Then, 2.5 ml of PVC solution was mixed with an appropriate concentration of plasticizer (as THF solution) to give a plasticizer content of from 10 to 50%. The solvent was allowed to evaporate under nitrogen. After 12 hours the films were peeled away from the container. They were dried in a vacuum oven at 50° C. for 12 hours. Film flexibility was compared by bending the films back and forth between the fingers; their Tg was also evaluated using a differential scanning calorimeter ("DSC"), as is known by one skilled in the art.

Relaxation in PVC from glassy to the plastic state and the effect of various chemical plasticizers were measured calorimetrically using DSC. The Tg was evaluated from the step change in heat capacity, Cp (value at half ΔCp is reported), when the sample was heated at a controlled heating rate of 10° C./min. All samples analyzed were exposed to a similar thermal history before measurement. The films obtained from the PVC and isobutylene/CO/ethylene polymers described above were colorless and transparent. Table I shows the decrease in the Tg of PVC upon addition of various levels of the isobutylene/CO/ethylene polymers.

TABLE 1

Effect of Isobutylene/CO/Ethylene Polymers on the Tg of PVC

| Plasticizer Concentration (wt. %) | Tg of PVC + Polymer of Example 1 (° C.) | Tg of PVC + Polymer of Example 2 (° C.) |
| --- | --- | --- |
| 0 | 82 | 82 |
| 10 | 67.2 | 62.6 |
| 20 | 54.9 | 43.1 |
| 30 | 46 | 28.2 |
| 40 | 38.9 | 21.4 |
| 50 | 32.4 | 12.7 |

FIG. 1 shows the decrease in the Tg of PVC upon addition of levels of the isobutylene/CO/ethylene polymers.

The decrease in the Tg of the PVC resin with isobutylene/CO/ethylene polymers provides evidence that these compositions are active as PVC plasticizers.

The foregoing examples clearly demonstrate that the instant invention provides compatible CO-containing plasticizers for use with PVC. More specifically, the PVC resins of the instant invention have decreased Tg. Additionally, the compositions produced in the non-limiting examples showed no evidence of phase separation, which suggests adequate compatibility.

Example 4

Synthesis of Isobutylene-CO-Ethylene Polymer

A 300-mL Autoclave Engineers™ reactor was charged with 125-mL of pure n-hexane and 10.4 g of isobutylene. 0.48 g of t-butyl peroxypivalate in 25-mL of pure n-hexane was loaded in an addition funnel and attached to the autoclave unit. The reactor was sealed and purged with purified nitrogen. The reactor was then pressurized with an ethylene and carbon monoxide (80:20) mixture. The temperature was raised to 66° C. while stirring, and peroxide solution was added to the reactor. The reactor pressure was maintained at 700 psig with the ethylene and carbon monoxide (80:20) mixture for 24 hours. The reactor was allowed to cool to room temperature and depressurized. Hexane was removed using a rotary evaporator, leaving 4.52 g of the colorless viscous product.

The IR spectrum of the product showed a very strong peak at 1713 cm$^{-1}$ due to the carbonyl group. Thus, CO has been incorporated in the product. $^{13}$C NMR spectrum of the product suggested that the polymer had 76 mole % of ethylene, 7 mole % of isobutylene and 17 mole % of CO. The NMR also suggested that there are 96 branches/1000 carbon atoms. GPC of the product indicated an Mn of 1070 and Mw of 1970 (polystyrene standards, THF solvent).

Example 5

Synthesis of Isobutylene-CO-Ethylene Polymer

A 300-mL Autoclave Engineers™ reactor was charged with 125-mL of pure n-hexane and 21.0 g of isobutylene. 0.48 g of t-butyl peroxypivalate in 25-mL of pure n-hexane was loaded in an addition funnel and attached to the autoclave unit. The reactor was sealed and purged with purified nitrogen. The reactor was then pressurized with an ethylene and carbon monoxide (80:20) mixture. The temperature was raised to 66° C. while stirring, and peroxide solution was added to the reactor. The reactor pressure was maintained at 700 psig with the ethylene and carbon monoxide (80:20) mixture for 24 hours. The reactor was allowed to cool to room temperature and depressurized. Hexane was removed using a rotary evaporator, leaving 4.73 g of the viscous product.

The IR spectrum of the product showed a very strong peak at 1712 cm$^{-1}$ due to the carbonyl group. Thus, CO has been incorporated in the product. $^{13}$C NMR spectrum of the product suggested that the polymer had 64 mole % of ethylene, 11 mole % of isobutylene and 25 mole % of CO. The NMR also suggested that there are 42.7 branches/1000 carbon atoms. GPC of the product indicated an Mn of 1780 and Mw of 3660 (polystyrene standards, THF solvent).

Example 6

Synthesis of Isobutylene-CO-Ethylene Polymer

A 1-L autoclave reactor was charged with 400-mL of pure n-hexane and 36.8 g of isobutylene. 1.97 g of t-butyl peroxypivalate in 25-mL of pure n-hexane was loaded in an addition funnel and attached to the autoclave unit. The reactor was sealed and purged with purified nitrogen. The reactor was then pressurized with an ethylene and carbon monoxide (80:20) mixture. The temperature was raised to 66° C. while stirring, and peroxide solution was added to the reactor. The reactor pressure was maintained at 700 psig with the ethylene and carbon monoxide (80:20) mixture for 24 hours. The reactor was allowed to cool to room temperature and depressurized. Hexane was removed using a rotary evaporator, leaving 12.27 g of the product.

The IR spectrum of the product showed a very strong peak at 1712 cm$^{-1}$ due to the carbonyl group. Thus, CO has been incorporated in the product. $^{13}$C NMR spectrum of the product suggested that the polymer had 64 mole % of ethylene, 8 mole % of isobutylene and 28 mole % of CO. The NMR also suggested that there are 46.9 branches/1000 carbon atoms. The GPC of the product indicated an Mn of 2080 and Mw of 3860 (polystyrene standards, THF solvent).

Example 7

Synthesis of Isobutylene-CO-Ethylene Polymer

A 1-L autoclave reactor was charged with 400-mL of pure n-hexane and 31.5 g of isobutylene. 0.55 g of t-butylperoxy-2-ethylhexanoate (Trigonox 21™) peroxide in 25-mL of pure n-hexane was loaded in an addition funnel and attached to autoclave unit. The reactor was sealed and purged with purified nitrogen. The reactor was then pressurized with an ethylene and carbon monoxide (80:20) mixture. The temperature was raised to 170° C. while stirring, and peroxide solution was added to the reactor. The reactor pressure was maintained at 3000 psig with the ethylene and carbon monoxide (80:20) mixture for 24 hours. The reactor was allowed to cool to room temperature and depressurized. Hexane was removed using a rotary evaporator, leaving 13.56 g of the liquid product.

The IR spectrum of the product showed a very strong peak at 1712 cm$^{-1}$ due to the carbonyl group. Thus, CO has been incorporated in the product. $^{13}$C NMR spectrum of the product suggested that the polymer had 75 mole % of ethylene, 6 mole % of isobutylene and 19 mole % of CO. The NMR also suggested that there are 100.1 branches/1000 carbon atoms. The GPC of the product indicated an Mn of 1590 and Mw of 4020 (polystyrene standards, THF solvent).

Example 8

Synthesis of Isobutylene-CO-Ethylene Polymer

A 1-L autoclave reactor was charged with 400-mL of pure n-hexane and 61.0 g of isobutylene. 0.57 g of t-butylperoxy-2-ethylhexanoate (Trigonox 21™) peroxide in 25-mL of pure n-hexane was loaded in an addition funnel and attached to an autoclave unit. The reactor was sealed and purged with purified nitrogen. The reactor was then pressurized with an ethylene and carbon monoxide (80:20) mixture. The temperature was raised to 170° C. while stirring, and peroxide solution was added to the reactor. The reactor pressure was maintained at 3000 psig with the ethylene and carbon monoxide (80:20) mixture for 24 hours. The reactor was allowed to cool to room temperature and depressurized. Hexane was removed using a rotary evaporator, leaving 10.54 g of the liquid product.

The IR spectrum of the product showed a very strong peak at 1712 cm$^{-1}$ due to the carbonyl group. Thus, CO has been incorporated in the product. $^{13}$C NMR spectrum of the product suggested that the polymer had 79 mole % of ethylene, 7 mole % of isobutylene and 14 mole % of CO. The NMR also suggested that there are 98.3 branches/1000 carbon atoms. The GPC of the product indicated an Mn of 1060 and Mw of 2080 (polystyrene standards, THF solvent).

Example 9

Synthesis of Isobutylene-CO-Ethylene Polymer

A 1-L autoclave reactor was charged with 400-mL of pure n-hexane and 33.5 g of isobutylene. 1.03 g of t-butylperoxy-2-ethylhexanoate (Trigonox 21™) peroxide in 25-mL of pure n-hexane was loaded in an addition funnel and attached to the autoclave unit. The reactor was sealed and purged with purified nitrogen. The reactor was then pressurized with an ethylene, carbon monoxide and hydrogen (70:15:15) mixture. The temperature was raised to 170° C. while stirring, and peroxide solution was added to the reactor. The reactor pressure was maintained at 3000 psig with the ethylene, carbon monoxide and hydrogen (70:15:15) mixture for 24 hours. The reactor was allowed to cool to room temperature and depressurized. Hexane was removed using a rotary evaporator, leaving 8.5 g of the liquid product.

The IR spectrum of the product showed a very strong peak at 1712 cm$^{-1}$ due to the carbonyl group. Thus, CO has been incorporated in the product. $^{13}$C NMR spectrum of the product suggested that the polymer had 81 mole % of ethylene, 5 mole % of isobutylene and 14 mole % of CO. The NMR also suggested that there are 118.8 branches/1000 carbon atoms. The GPC of the product indicated an Mn of 820 and Mw of 1500 (polystyrene standards, THF solvent).

Example 10

Use of Raff-I in the Synthesis of C4 Olefins-CO-Ethylene Polymer

A 300-mL Autoclave Engineers™ reactor was charged with 125-mL of pure n-hexane and 21.0 g of with Raff-I gas mixture, which contained 31.0% of isobutylene, 42.94% of 1-butene, 12.5% of 2-butene, 12.5% of trans-2-butene and 1.06% of butadiene. 0.48 g of t-butyl peroxypivalate in 25-mL of pure n-hexane was loaded in an addition funnel and attached to the autoclave unit. The reactor was sealed and the temperature was raised to 66° C. while stirring and peroxide solution was added to the reactor. The reactor was then pressurized with ethylene/carbon monoxide (80/20) feed to 700 psig. The reactor pressure was maintained at 700 psig with the ethylene/carbon monoxide (80/20) feed for 24 hours. The reactor was allowed to cool to room temperature and depressurized. Hexane was removed using a rotary evaporator, leaving 1.84 g of the colorless viscous product.

The IR spectrum of the product showed a very strong peak at 1712 cm$^{-1}$ due to the carbonyl group. Thus, CO has been incorporated in the product. $^{13}$C NMR spectrum of the product suggested that the polymer had 22 mole % of CO. The NMR also suggested that there are 79.2 branches/1000 carbon atoms and that isobutylene and 2-butene have been incorporated into the polymer. The GPC of the product indicated an Mn of 840 and Mw of 1530 (polystyrene standards, THF solvent).

The invention having been thus described, it will be apparent that the same may be varied in many ways without departing from the spirit and scope of the invention as defined by the following claims.

What is claimed is:

1. A composition comprising a branchy, random geminally disubstituted olefin-carbon monoxide-ethylene polymer.

2. The composition of claim 1 wherein said polymer comprises a polymer having a number average molecular weight of from about 200 to about 150,000.

3. The composition of claim 1 wherein said geminally disubstituted olefin comprises isobutylene.

4. The composition of claim 1 wherein said polymer comprises 1–40 mole % of said geminally disubstituted olefin, 3–40 mole % of said carbon monoxide, and 5–80 mole % of said ethylene.

5. The composition of claim 1 wherein said polymer further comprises a monomer X, wherein said monomer X comprises a free radical polymerizable monomer or mixtures of monomers.

6. The composition of claim 5 wherein said monomer X is selected from the group consisting of $C_3$ to $C_{30}$ alpha-olefins, $C_3$ to $C_{30}$ internal olefins, styrene, styrene derivatives, unsaturated mono- and dicarboxylic acids of 3–20 carbon atoms, esters of such unsaturated mono- and dicarboxylic acids, vinyl esters of saturated carboxylic acids wherein the acid group has 1–18 carbon atoms, vinyl alkyl ethers wherein the alkyl group has 1–18 carbon atoms, halogenated ethylene derivatives, methyl vinyl ketone, 1-vinylpyrrolidone, acrylonitrile, acrylamide, acrolein, allyl alcohol, allyl chloride, allyl acetate, and mixtures thereof.

7. The composition of claim 5 wherein said mixtures of monomer X are selected from one of raffinate I and raffinate II, wherein said raffinate I comprises 34 wt. % of 1-butene, 20 wt. % of 2-butenes, 25 wt. % of isobutylene, 17 wt. % of butanes, 0.5 wt. % of butadiene and 3.5 wt. % of other compounds, further wherein raffinate II comprises 45 wt. % of 1-butene, 25 wt. % of 2-butenes, 4 wt. % of isobutylene, 21 wt. % of butanes, 0.3 wt. % of butadiene and 4.7 wt. % of other compounds.

\* \* \* \* \*